Figure 1:
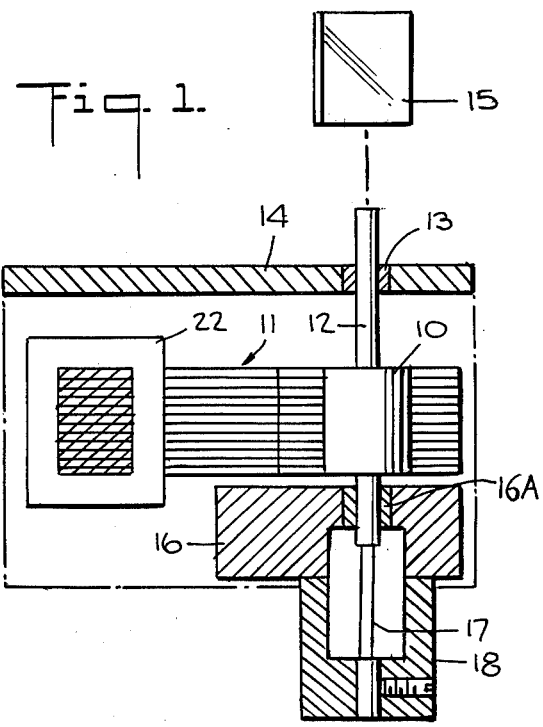

United States Patent [19]
Brill

[11] 4,302,720
[45] Nov. 24, 1981

[54] GALVANOMETER-TYPE MOTOR

[75] Inventor: Henry L. Brill, Flushing, N.Y.

[73] Assignee: Bulova Watch Company, Flushing, N.Y.

[21] Appl. No.: 31,997

[22] Filed: Apr. 20, 1979

[51] Int. Cl.³ ............................................. G01R 1/20
[52] U.S. Cl. .................................... 324/146; 350/486
[58] Field of Search ................. 335/229; 350/285, 6.6; 324/146; 178/7.3

[56] References Cited

U.S. PATENT DOCUMENTS

| 1,941,319 | 12/1933 | Pfaffenberger | 350/285 |
| 3,186,115 | 6/1965 | Todt et al. | 350/285 |
| 3,343,451 | 9/1967 | Durocher | 350/285 |
| 3,532,408 | 10/1970 | Dostal | 350/285 |
| 4,175,832 | 11/1979 | Umeki | 350/285 |

Primary Examiner—Michael J. Tokar
Attorney, Agent, or Firm—Michael Ebert

[57] ABSTRACT

A galvanometer-type motor for driving an optical element to deflect or otherwise modulate a radiant energy beam, the motor having a favorable mass-to-torque ratio that renders it capable of oscillating at a high-frequency rate and of performing other movements in accordance with an input current. The motor includes a permanent magnet rotor and a soft magnetic stator having a pair of split pole pieces extending from a pair of arms that are joined by a bridge forming the core of a field coil. The split pole pieces are disposed on opposite sides of the rotor whose axis of rotation is centered with respect thereto, the rotor being supported for rotation by means including a torsion spring acting to return the rotor to its neutral rest position. In the neutral position, the split poles of each piece straddle the end poles of the rotor on the related side thereof. Current supplied to the field coil polarizes the split pole pieces of the stator, producing magnetic forces creating a torque causing the rotor to turn in a direction depending on the current direction.

7 Claims, 4 Drawing Figures

GALVANOMETER-TYPE MOTOR

BACKGROUND OF INVENTION

This invention relates generally to galvanometer-type motors, and more particularly to a motor for driving an optical element to deflect at a high frequency or to otherwise modulate a beam of radiant energy impinging thereon.

Various forms of optical devices are in use which are adapted to scan, sweep, chop or to otherwise deflect or modulate a beam of radiant energy. Such optical devices are incorporated in mass spectrometers, bolometers, horizion sensors and in other instruments which utilize or analyze nuclear, X-ray or laser beams, or other beams of radiant energy in the visible, ultraviolet or infrared region of the spectrum. In recent years, the need has arisen for optical scanners adapted to sweep light beam across binary coded bars such as United Product Code symbols or similar indicia to carry out various computerized functions.

One known means for this purpose makes use of a galvanometer to deflect the optical element, the galvanometer being of the moving iron type in which a soft iron rotor or armature is biased by one or more stationary permanent magnets. The rotor is made to oscillate by supplying alternating current to at least one field coil included in the stator structure.

It is also known to make use of DC torque motors that include permanent magnet rotors and a sophisticated coil wiring arrangement to generate the required torque. The drawback of this type of motor is that the rotor possesses a relatively high mass and affords an unfavorable mass-to-torque ratio, making it virtually impossible to operate the motor at the high frequencies required in many optical scanning applications. Moreover, the complex coil arrangement dictated by these torque motors to generate the necessary torque introduces manufacturing difficulties and makes such motors expensive to produce.

In order to reduce the mass of the rotor in an optical scanner of the galvenometer type, U.S. Pat. No. 3,799,644 to Street and U.S. Pat. No. 3,549,800 to Baker both disclose galvanometer type motors in which a beam deflection mirror is mounted on a rotor which takes the form of a coreless coil rotatable within a permanent magnet stator. Not only are such motors magnetically inefficient, but the excitation current therefor must be delivered to the moving rotor coil, and to this end conductive torsion spring fibers are necessary. Such fibers are relatively delicate and adversely affect the operating life of the galvanometer.

Also of prior art interest are the patents to Montagu, U.S. Pat. No. 3,959,673 and 3,624,579 which disclose an optical scanning motor having a soft iron rotor mounted on a torsion spring between symmetrically-arranged stators having field windings. These stators are formed by two pairs of soft-iron pole pieces at diametrically opposed positions with respect to the rotor, a pair of permanent magnets cooperating with the pole pieces to define biasing and driving flux paths.

Of general background interest are the patents to Reich et al. U.S. Pat. No. 3,999,833; Carriker U.S. Pat. No. 3,900,749 and Kato et al. U.S. Pat. No. 3,874,778.

SUMMARY OF INVENTION

In view of the foregoing, the main object of this invention is to provide a galvanometer-type motor for efficiently and reliably driving an optical or other element, the motor having a favorable mass-to-torque ratio which renders it capable of oscillating at a high frequency rate or of performing other movements in accordance with an input current.

More particularly, an object of this invention is to provide a motor of the above-noted type having a permanent magnet rotor and a soft magnetic stator, the torque being developed by means including a single stator field coil and being linearly proportional to the current passing through the coil.

Also an object of the invention is to provide a galvanometer-type motor having a highly-simplified construction entailing a relatively small number of components, whereby the motor may be quickly assembled and manufactured at low cost.

Briefly stated, these objects are attained in a motor that includes a permanent magnet rotor and a soft magnetic stator having a pair of split pole pieces extending from a pair of arms joined by a bridge forming the core of a field coil.

The split pole pieces of the rotor are symmetrically disposed on opposite sides of the rotor whose axis of rotation is centered with respect thereto. The rotor is supported for rotation by means including a torsion spring acting to return the rotor to its neutral rest position, at which position the split poles of each piece of the permanent magnet rotor on the related side thereof.

Current supplied to the field coil acts to polarize the split pole pieces of the stator whereby the split poles of each piece are in attractive and repelling relationship with the end poles of the rotor. The resultant magnetic forces create a torque causing the rotor to turn in a direction depending on the current direction. By applying a high-frequency alternating current to the field coil, the rotor is caused to oscillate efficiently at the same rate. Since the motor is capable of following a current input which may vary from DC to a high-frequency rate, the motor is capable of moving on command to specific positions.

OUTLINE OF DRAWINGS

Figure 2:
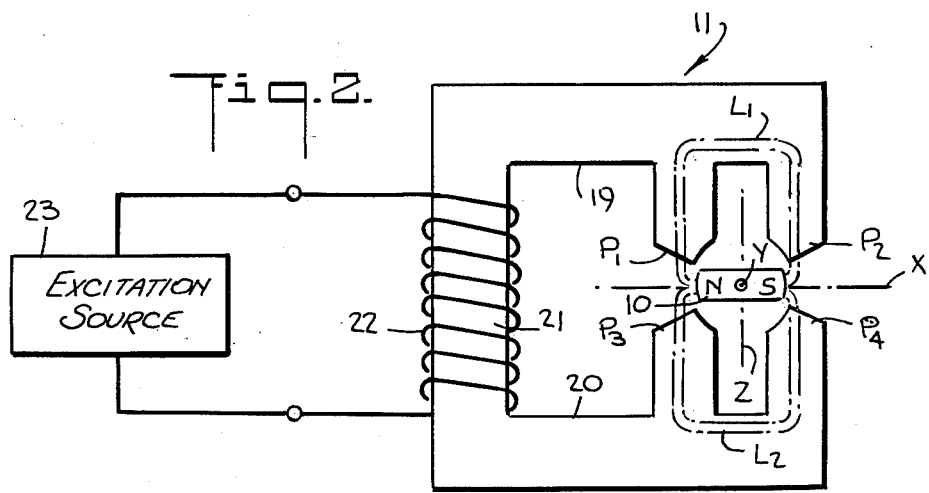
Figure 3:
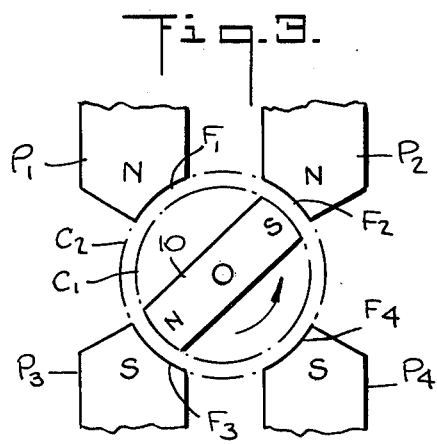
Figure 4:
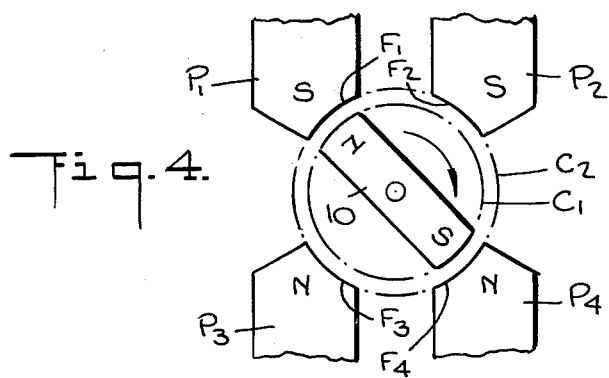

For a better understanding of the invention as well as other objects and further features thereof, reference is made to the following detailed description to be read in conjunction with the accompanying drawings, wherein:

FIG. 1 schematically illustrates in a sectional view a galvanometer-type motor in accordance with a preferred embodiment of the invention, the rotor being shown in its actuated position;

FIG. 2 schematically illustrates the motor in plan view, the rotor being shown in its neutral position;

FIG. 3 shows the rotor torque produced in response to field coil current flow in one direction; and FIG. 4 shows the rotor torque produced in response to current flow in the reverse direction.

DESCRIPTION OF INVENTION

Magnetic Materials:

The pure natural elements which are ferromagnetic are iron, nickel, cobalt and some earth metals. Ferromagnetic materials of value to industry for their magnetic properties are almost invariably alloys of the metallic ferromagnetic elements with one another or with other elements.

Commercial magnetic materials are divided into two main groups: (1) magnetically "soft" materials, and (2)

magnetically "hard" materials. The distinguishing characteristic of "soft" magnetic materials is high permeability, these materials being usually employed as cores in the magnetic circuits of electromagnets. "Hard" magnetic materials are characterized by a high maximum magnetic energy product $(BH)_{max}$. These materials are employed as permanent magnets to provide a constant magnetic field when it is inconvenient or uneconomical to produce this field by an electromagnet.

In the specification, the term "soft magnetic stator" refers to a stator formed of magnetically soft material, and the term "permanent magnet rotor" refers to a rotor formed of hard magnetic material.

Motor Structure:

Referring now to the drawing and in particular to FIGS. 1 and 2, it will be seen that the oscillating motor according to the invention comprises a rotor in the form of a bar-shaped permanent magnet 10 having end poles N and S, the rotor being supported for rotation within a stator structure, generally designated by numeral 11.

Rotor 10 is mounted on a light-weight shaft 12 extending through the exact center of the bar-shaped magnet, the upper end of the shaft projecting through a bearing 13 fitted into the frame 14 of the motor. The upper end of shaft 12 is operatively coupled to an optical element 15. The nature of this element and its relationship to a beam of radiant energy impinging thereon forms no part of the present invention whose concern is only with an oscillating motor capable of driving any form of optical element or equivalent device at a high frequency rate.

The lower end of a rotor shaft 12 extends through a bearing 16A fitted into a block 16 secured to the inner wall of the motor frame, the end of the shaft being welded or otherwise attached to one end of a torsion spring 17 which lies within a bushing 18 and is anchored thereon.

Stator 11 is constituted by a U-shaped structure of soft magnetic material defined by a pair of arms 19 and 20 which are joined by a bridge 21, the arms bearing a pair of inwardly-directed split pole pieces $P_1$-$P_2$ and $P_3$-$P_4$. These pieces are symmetrically arranged on opposing sides of rotor 10 in its neutral position, as shown in FIG. 2, the axis of rotation Y of rotor 10 being centered with respect to the split pole pieces. The soft magnetic stator structure formed by the split pole pieces, arms 19 and 20 and bridge 21 are preferably defined by stacked laminations of an annealed nickel-iron alloy having high permability and low hysteresis.

The north and south pole ends (N and S) of rotor magnet 10 are rounded and the faces $F_1$ to $F_4$ of split pole pieces $P_1$-$P_2$ and $P_3$-$P_4$ have a complementary concave formation. The circle $C_1$ (see FIG. 3) which includes the arcs defined by the rounded ends of rotor 10 is concentric with the circle $C_2$ of slightly larger diameter, which includes the arcs defined by the concave faces $F_1$ to $F_4$ of the split pole pieces, these circles being coaxial with the center axis of rotation of the rotor. Thus a small concentric gap is formed between the split pole pieces of the stator and the polarized ends of the permanent magnet rotor.

Wound about bridge 21 of the stator is a single field coil 22 which is connected to an excitation current source 23. Torsion spring 17 maintains rotor 10 so that in its neutral position, the longitudinal axis X of the bar-shaped rotor lies at right angles to the axis Z which extends along a line midway between the split poles of each stator pole piece, the rotor axis of rotation Y being mutually perpendicular to axis X and Z.

The arrangement is such that the split poles $P_1$-$P_2$ of the upper pole piece in the neutral position of the rotor bridge the distance between the pole ends N and S of the bar-shaped rotor on one side thereof, and the split poles $P_3$-$P_4$ of the lower pole piece similarly bridge the distance between the pole ends of the rotor on the opposite side thereof.

As shown by dotted lines $L_1$, the magnetic lines of flux $L_1$ emanating from the N and S pole ends of permanent magnet rotor 10 on one side thereof pass through split poles $P_1$-$P_2$ of the upper pole piece to define a closed loop, while the magnetic lines of flux represented by $L_2$ emanating from the pole ends on the other side of the rotor and passing through split poles $P_3$-$P_4$ of the lower pole piece also defines a closed loop, thereby forming efficient, closed magnet circuits.

It is of advantage to have the split poles of the pair of pole pieces so arranged that the distance therebetween is equal to or slightly less than the width of the permanent magnet rotor. This will assure that rotor magnet 10 will assume a center rest position as shown in FIG. 2, and that the magnet will not bias the action of the return spring 17. The choice of permanent magnet material is important, and it is advantageous to employ a material which exhibits high values of magnetic density and high coercive force, such as rear earth materials or platinum-cobalt alloys.

Motor Operation:

In operation, when current from excitation source 23 is supplied in a given direction to field coil 22, split poles $P_1$ and $P_2$ of the upper pole piece become polarized, and split poles $P_3$ and $P_4$ of the lower pole piece assume an opposite polarization.

We shall assume in connection with FIG. 3 that the current direction is such that split poles $P_1$ and $P_2$ of the upper piece are polarized North while split poles $P_3$ and $P_4$ of the lower piece are polarized South. Since split poles $P_1$ and $P_2$ lie adjacent the N and S pole ends of permanent magnet rotor 10 on one side thereof and split poles $P_3$ and $P_4$ lie adjacent these pole ends on the other side thereof, pole end N of the rotor will be attracted toward pole $P_3$ (S) while being repelled by pole $P_1$ (N). At the same time, pole end S of the rotor is attracted toward pole $P_2$ (N) and repelled by pole $P_4$ (S).

The resultant magnetic force couple creates a powerful torque, causing rotor 10 to turn in a counterclockwise direction, as shown in FIG. 3. When the direction of current applied to the field coil is reversed, the force couple relationships are reversed, as shown in FIG. 4, and as a consequence, the torque produced thereby causes the rotor to turn in the clockwise direction.

Thus by applying a current to the field coil which periodically alternates at a high frequency rate, the rotor may be caused to oscillate at the same rate. The magnetic field generated by the stator field coil is completely concentrated in the region of the split pole pieces which also carry the flux from the permanent magnet. This arrangement results in a much higher torque-to-mass ratio than is attainable in conventional galvanometer structures.

In many cases, the galvanometer-type motor in accordance with the invention is not required to oscillate but to perform other excursions, depending on the waveform of the input current. Thus the rotor may be caused to move on command for specific positions or to move in steps of variable amplitude. In this way, the motion of the low-inertia rotor simulates the waveform of the input current. Optical scanners are often called upon to generate a sawtooth motion with a fast flyback, this being made possible with a low-inertia rotor in accordance with the invention.

While there has been shown and described a preferred embodiment of an electromagnetic oscillating motor in accordance with the invention, it will be appreciated that many changes and modifications may be made therein without, however, departing from the essential spirit thereof.

I claim:

1. A galvanometer-type motor for driving an optical element to deflect or otherwise modulate a radiant energy form, the motor having a favorable mass-to-torque ratio and comprising:

A a permanent magnetic rotor supported for rotation on an axis of rotation, said rotor being a bar magnet having North and South end poles;

B a stator of soft magnetic material having first and second split pole pieces extending respectively from first and second arms joined by a bridge forming the core of a field coil, the first and second split pole pieces being disposed on opposite sides of the bar magnet whose axis of rotation is centered with respect thereto; whereby when current in a given direction is supplied to said field coil, the split pole piece on the first arm is polarized North and the split pole piece on the second arm is polarized South;

C means to return said rotor to a neutral position in which the split poles of each piece straddle the end poles of the rotor on the related side thereof; and D means supplying current to the field coil to cause the rotor to move accordingly.

2. A motor as set forth in claim 1, wherein said rotor bar magnet has rounded ends whose arcs are included in a circle, and said split poles of the pole pieces have concave faces whose arcs are included in a second circle of slightly larger diameter, which circles are coaxial with the axis of rotor rotation.

3. A motor as set forth in claim 1, wherein said stator is formed of stacked laminations of high permeability iron annealed for minimum magnetic hysteresis.

4. A motor as set forth in claim 1, wherein said permanent magnet rotor is fabricated of a high strength rare earth metal.

5. A motor as set forth in claim 1, wherein said rotor is mounted on a shaft supported by bearings, one end of the shaft being attached to a torsion spring constituting said return means.

6. A motor as set forth in claim 1, wherein said current applied to the coil alternates at a high frequency to cause the rotor to oscillate at the same frequency.

7. A motor as set forth in claim 1, wherein said current applied to said coil has a sawtooth waveform with fast flyback to cause the rotor to move in a manner simulating this waveform.

* * * * *